US010388273B2

(12) United States Patent
Garner et al.

(10) Patent No.: US 10,388,273 B2
(45) Date of Patent: Aug. 20, 2019

(54) DISTRIBUTED VOICE PROCESSING SYSTEM

(71) Applicant: ROKU, Inc., Saratoga, CA (US)

(72) Inventors: Gregory M. Garner, Saratoga, CA (US); Anthony Wood, Saratoga, CA (US)

(73) Assignee: ROKU, INC., Los Gatos, CA (US)

( * ) Notice: Subject to any disclaimer, the term of this patent is extended or adjusted under 35 U.S.C. 154(b) by 14 days.

(21) Appl. No.: 15/233,207

(22) Filed: Aug. 10, 2016

(65) Prior Publication Data

US 2018/0047386 A1 Feb. 15, 2018

(51) Int. Cl.
*G10L 15/08* (2006.01)
*G10L 15/22* (2006.01)
*G10L 21/0208* (2013.01)

(52) U.S. Cl.
CPC .............. *G10L 15/08* (2013.01); *G10L 15/22* (2013.01); *G10L 21/0208* (2013.01); *G10L 2015/088* (2013.01); *G10L 2015/223* (2013.01)

(58) Field of Classification Search
CPC ... G10L 15/08; G10L 15/22; G10L 2015/088; G10L 2015/223
USPC ......................................................... 704/233
See application file for complete search history.

(56) References Cited

U.S. PATENT DOCUMENTS

| 8,428,661 | B2 * | 4/2013 | Chen | H04R 3/005 |
| | | | | 455/570 |
| 9,734,822 | B1 * | 8/2017 | Sundaram | G10L 15/08 |
| 9,818,425 | B1 * | 11/2017 | Ayrapetian | G10L 21/0224 |
| 9,940,949 | B1 * | 4/2018 | Vitaladevuni | G10L 25/78 |
| 2004/0267387 | A1 * | 12/2004 | Samadani | G11B 27/034 |
| | | | | 700/94 |
| 2006/0028337 | A1 * | 2/2006 | Li | G08C 17/00 |
| | | | | 340/539.1 |
| 2006/0135098 | A1 * | 6/2006 | Yarosz | H04B 1/0053 |
| | | | | 455/161.2 |
| 2010/0241428 | A1 | 9/2010 | Yiu | |
| 2015/0331666 | A1 * | 11/2015 | Bucsa | G10L 15/30 |
| | | | | 704/275 |
| 2017/0069321 | A1 * | 3/2017 | Toiyama | G10L 15/22 |
| 2017/0147282 | A1 * | 5/2017 | Seo | G10L 19/16 |
| 2017/0236512 | A1 * | 8/2017 | Williams | G06F 16/68 |
| | | | | 381/79 |

(Continued)

OTHER PUBLICATIONS

International Search Report and Written Opinion of the International Searching Authority for International Application No. PCT/US17/44879, dated Oct. 31 2017 (16 pages).

*Primary Examiner* — Edwin S Leland, III
(74) *Attorney, Agent, or Firm* — Sterne, Kessler, Goldstein & Fox P.L.L.C.

(57) ABSTRACT

Disclosed herein are system, method, and computer program product embodiments for distributed voice processing. An embodiment operates by receiving audio data from microphones associated with a plurality of devices distributed across an area of interest. A trigger word is detected in the audio data received from at least one of the devices. Responsive to detecting the trigger word, a voice command processing system associated with a multimedia device is activated. Based on the audio data received from at least two or more of the devices, a voice command associated with the multimedia device is determined. The multimedia device is controlled in accordance with the voice command.

20 Claims, 6 Drawing Sheets

(56) References Cited

U.S. PATENT DOCUMENTS

2018/0033428 A1\* 2/2018 Kim ................. G10L 15/08
2018/0047386 A1\* 2/2018 Garner ............... G10L 15/08

\* cited by examiner

DISTRIBUTED VOICE PROCESSING SYSTEM

BACKGROUND

Field

The field is related to distributed voice processing technologies.

Background

Voice command systems have been growing in popularity. A device that can be operated by voice command will often have a built-in microphone that receives a voice command from a user. The device then executes the command. However, the execution of the command is dependent on the clarity of the voice command received from the user, and relying on only a single microphone built into the device is often not sufficient for effective and consistent operation. For example, background noise or other sounds may obstruct or distort the received voice command, making the user's voice command difficult if not impossible to discern and process.

BRIEF DESCRIPTION OF THE DRAWINGS

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

SUMMARY

Provided herein are system, apparatus, article of manufacture, method and/or computer program product embodiments, and/or combinations and sub-combinations thereof, for distributed voice processing.

An embodiment includes a computer implemented method for distributed voice processing. The embodiment operates by receiving audio data from microphones associated with a plurality of devices distributed across an area of interest. A trigger word is detected in the audio data received from at least one of the devices. Responsive to detecting the trigger word, a voice command processing system associated with a multimedia device is activated. Based on the audio data received from at least two or more of the devices, a voice command associated with the multimedia device is determined. The multimedia device is controlled in accordance with the voice command.

Additional embodiments include a system and a tangible computer-readable device having instructions stored thereon that, when executed by at least one computing device, causes the computing device to perform operations substantially similar to those described above.

DETAILED DESCRIPTION

Figure 1:
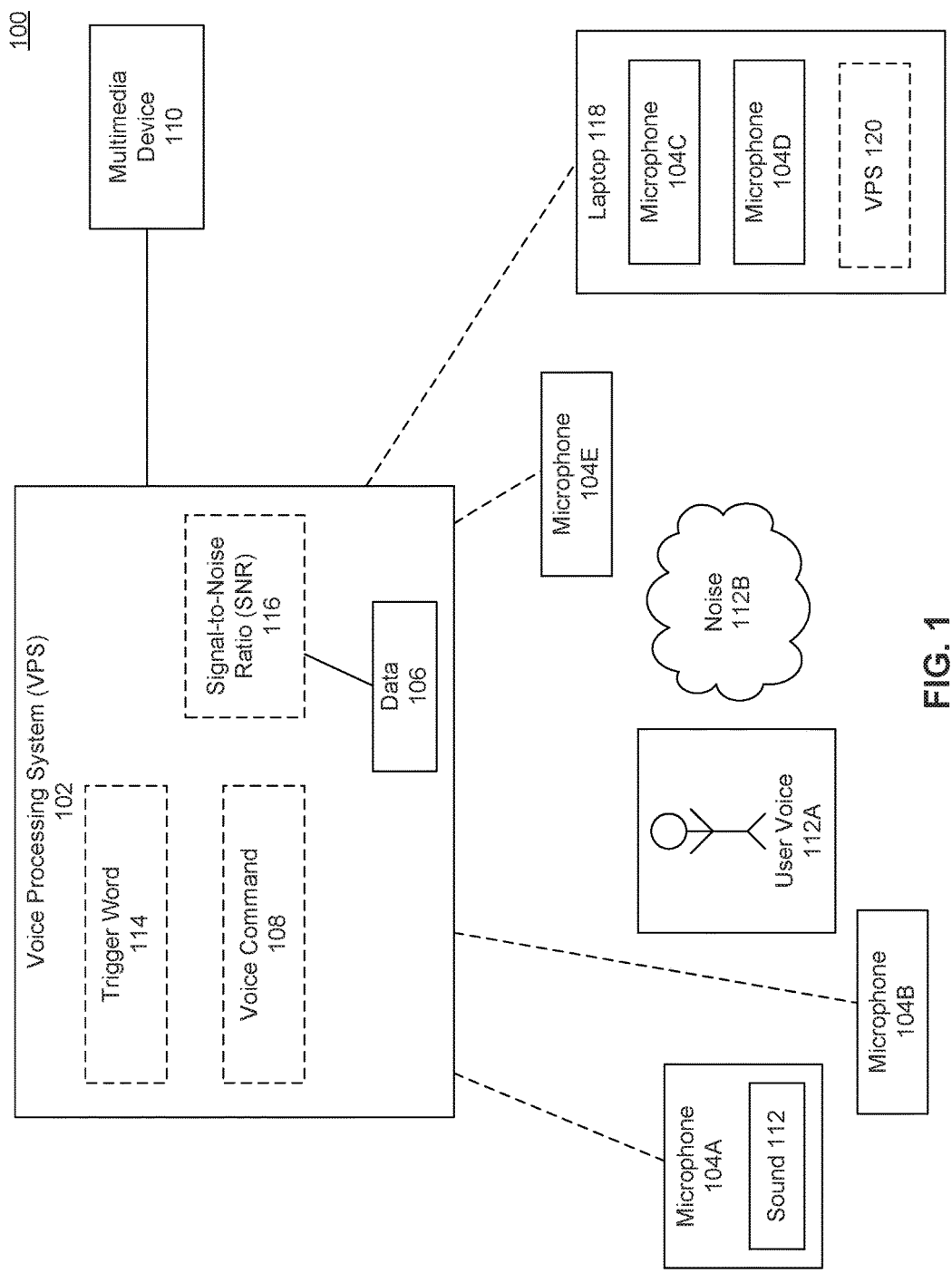
FIG. 1 is a block diagram of a distributed voice processing system, according to an example embodiment.

FIG. 1 is a block diagram of a distributed voice processing system 100, according to an example embodiment. A voice processing system (VPS) 102 may receive audio data 106 from a plurality of microphones 104A-E physically arranged or dispersed throughout a geographic area of interest, for example an office or a house. According to some embodiments, the received data 106 may be processed and combined (from multiple microphones 104) to determine who was speaking, what words or commands may have been said by a user, and to identify and/or cancel out background noise. As an example, voice commands 108 identified as being received from a user may operate a multimedia device 110 such as a television, computer, stereo system, multimedia server, cell phone, climate control, lighting, security, or other system, device or combination thereof that may be voice activated. Voice commands 108 may alternatively or additionally operate other computing devices not related to multimedia.

Generally, many different devices have microphones that are capable of receiving sounds (that is, audio data) from the environment, including voice commands. Each device may have its own built-in microphone used to receive sounds or audio commands related only to the particular device, and if understood, the command will be executed on and by the device. Such an arrangement however can be problematic if the microphone is not functioning properly, if a user is located far away from the device, if the user has a soft or otherwise hard to understand voice, or if there is significant background noise that makes the user's voice difficult to hear or distinguish. System 100 alleviates many of these issues according to various embodiments.

System 100 includes a plurality of microphones 104 that are communicatively coupled or networked such that their data can be combined for distributed voice and sound processing. Microphones 104 may include stand-alone microphones and/or microphones integrated into other devices such as speakers, televisions, laptops, cell phones, remote controls, or other devices.

Microphones 104 may receive sounds 112 from the environment. In an embodiment, sounds 112 may include a user voice 112A and/or noise 112B, or some combination of the two. User voice 112A may be any sound that is to be analyzed by VPS 102. VPS 102 may to identify trigger word(s) 114 and/or voice command(s) 108 (and/or identify a user), or otherwise reduce noise 112B or improve user voice 112A or sound quality. User voice 112A may include audio data (e.g., as captured by one or more microphones 104) from one or more users who are authorized or authenticated to activate or control multimedia device 110. Or, for example, user voice 112A may include the audio data from a person (who may or may not be authenticated) who speaks a trigger word 114 and/or voice command 108 recognized by VPS 102. In an embodiment, user voice 112A may include sounds from a computer, speaker, musical or electronic instrument, or other system (including electronic noises) that are to be processed. In an embodiment, VPS 102 may perform processing to determine whether the received sounds are from a live speaker or are previously recorded.

Noise 112B may include any sounds not intended for voice processing by VPS 102. Noise 112B may include the voices of other users or people, music, cars, horns, background or ambient noise, thunder, silence (e.g., no distinguishable or discernable noise), or any other noise or sounds that do not include or are otherwise not intended to issue a trigger word 114 or voice command 108 to VPS 102. In an embodiment, VPS 102 may be recording the voices of one or more users, in which case noise 112B may be any sounds not intended to be recorded by the users.

Noise 112B may include words or other sounds spoken by a particular user that are not intended for voice processing by VPS 102 (e.g., words that are not voice commands 108). In an embodiment, each microphone 104 may receive, as sound 112 (or audio data 106), user voice 112A, noise 112B, neither, or a combination of both. Depending on where a particular microphone 104A is located relative to the source(s) of user voice 112A and/or source(s) of noise 112B, as well as a microphone's own physical, electrical, and/or acoustic characteristics, different microphones 104 may receive sounds 112 in different proportions or ratios of user voice 112A to noise 112B and/or with different or varying clarity. The received sounds 112 may be transmit to VPS 102 from microphones 104 for processing. In an embodiment, VPS 102 may determine the ratio of user voice 112A to noise 112B as a signal-to-noise ratio (SNR) 116. SNR 116 may be measure or indication of a clarity of user voice 112A, which may be measured relative to a clarity of noise 112B.

In an embodiment, SNR 116 compares the level of a desired signal (e.g., voice 112A) to a level of background noise 112B, and is often expressed in decibels. An SNR 116 greater than 1:1 (0 decibels) indicates more signal than noise. In an embodiment, VPS 102 may use SNR 116 to identify the strongest or un-distorted signal or audio data 106 from one or more microphones 104, using one of the microphones 104 as being representative or a reference signal. The reference microphone 104 may be selected arbitrarily, based on location relative to other microphones (e.g., the most centrally located microphone), or based on historical SNR patterns (e.g., the microphone 104 that often falls in the middle of the SNR range of the microphones 104 based on previous calculations). In an embodiment, VPS 102 may include circuitry configured to perform SNR 116 analysis. Such circuitry may operate using any well-known SNR signal processing measurement algorithm or process, and/or may be implemented using any well-known SNR measurement apparatus or component.

Audio data 106 may be received from microphones 104A-E and processed by VPS 102. Processing may include, for example, computing a SNR 116 for data 106 received from each of different microphones 104 or microphone groups/devices (e.g., 118). Data 106 may then be combined and processed to determine whether and/or which trigger words and/or voice commands 108 exist within data 106. For example, audio data 106 received from a first microphone 104A may be processed to determine if a trigger word 114 or voice command 108 may be identified. If none can be identified, processing may continue on audio data 106 from a second microphone 104B, and so on until trigger word 114 or voice command 108 can be identified from one of the microphones 104. If no trigger word 114 or voice command 108 may be identified from any individual microphone 104, then data 106 from multiple microphones 104 (received or recorded over similar periods of time) may be combined and processed (e.g., including performing noise reduction) to determine if any words 114 or commands 108 can be identified. Audio data 106 from any combination of microphones 104 may be combined, and such microphones may be from the same or different devices (such as laptop 118 and stand-alone microphone 104E), or combinations thereof. In embodiments, audio data 106 from two or more microphones 104 may be combined in any well-known manner.

Microphones 104 located closer to the source of user voice 112A (e.g., the person speaking) will generally have a higher (more preferred) SNR 116. As noted above, the SNR 116 may vary based on audio/electrical characteristics of the microphones 104A and/or their placement, direction (in which the microphone 104 is pointed and/or sound 112 from a source is directed), or location relative to the source(s) of user voice 112A and/or noise 112B. As such, in the example shown, microphone 104A may have the highest SNR 116 being the most proximally located to the source of user voice 112A, while microphones 104C and 104D may have the lowest, being proximally located to the source of noise 112B.

In other examples, microphones 104 that have the highest SNR 116 may vary, or change as a user is speaking (for example, a user may be moving around the room or geographic area while speaking. Similarly, the source(s) of the noise 112B may be moving, or new sources of audio data may begin as a user is speaking. Similarly, microphones 104 may be moving (e.g., such as microphone on a cellphone or laptop that a user is carrying from one location to another). As such, the SNR 116 determined and associated with each microphone 104 may vary over different time intervals, or even across a single data set that includes trigger word 114 and/or one or more voice commands 108. In an embodiment, over a course of a single word, voice command 108, or other voice interaction with VPS 102, the weight applied to different audio data 106 from the different microphones 104 may vary over different time intervals. In an embodiment, VPS 102 may determine or apply the greatest weight to microphones 104 that it determines to have the highest SNR 116 over a particular time interval.

In an embodiment, at a particular time interval the data 106 from the microphone(s) 104 having the greatest signal-to-noise ratios 116 may be used to determine whether or not trigger word 114 or voice command 108 is present in the data set 106. In another embodiment, data 106 received from all or any subset of microphones 1104 may be used or combined to interpret data 106 for the presence of trigger words 114 or voice commands 108. For example, those data sets 106 with the highest SNR 116 may be used to enhance or amplify user voice 112A, while those data sets 106 with the lowest SNR 116 may be used to cancel, reduce or depress the amount of noise in a combined data set 106. For example, certain data 106 received from microphones 104 that may have received more noise 112B than sound 112A may be used to cancel out the noise 112B from data 106 received from other microphones 104 that may have received more voice 112A than noise 112B.

By combining distributed data 106 in this manner, VPS 102 may create the best possible voice or sound sample (e.g., with the highest SNR 116). In an embodiment, the combined SNR 116 may be higher than any individual microphone 104 SNR 116 for a received audio sample or data 106. VPS 102 may then use the combined or best data 106 (from one or more of microphones 104) to determine whether either trigger word 114 and/or voice command 108 was received by any of the microphones 104. In an embodiment, VPS 102 may use a maximum rate combining algorithm to combine the signals/data, depress the noise 112B, and acoustically enhance or amplify the user voice 112A.

VPS 102 may receive the sounds 112 captured by different microphones 104, or sets of microphones (e.g., 104C and 104D) as (audio) data 106. As shown in the example, microphones 104C and 104D may both be microphones associated with a laptop 118 (or another device, such as a tablet, smartphone, etc.). In an embodiment, microphones 104C and 104D may be built into laptop 118, or otherwise in wired or wireless communication with laptop 118. The microphones 104C and 104D of laptop 118 may receive sounds 112 and may transmit those sounds 112 to VPS 102 individually or as a group. For example, a device, such as laptop 118, may already have well-known audio processing capabilities that may process or otherwise combine sounds 112 received from multiple microphones that are physically built into and/or otherwise are wired or wirelessly connected to the device. This combined sound or audio data may then be transmit by laptop 118 to VPS 102 for further processing and/or combination with the audio data 106 received from one or more other microphones 104 or microphone groups (e.g., groups of microphones integrated into a single device or other sub-network, which may be wired or wirelessly coupled to each other).

Laptop 118 is one example of a microphone group or device that may be used to receive audio data 106. Other examples include cell phones, remote controls, speakers, televisions, or any other device that has an integrated, connected, or communicatively coupled one or more microphones or audio receiving devices or circuitry. Any different number of microphone enabled devices may be used with system 100 to provide audio data 106 to VPS 102. In an embodiment, each microphone 104 may include numerous microphones that are arranged or physical, electronically, or communicatively coupled together.

In an embodiment, a computing device (e.g., a device with its own processing capabilities) such as laptop 118 may have one or more microphones 104 as well as its own local VPS 120. The local VPS 120 may perform the functionality (or a portion thereof) as described herein with respect to VPS 102. Local VPS 120 may be networked or otherwise communicatively coupled with VPS 102 to expand audio processing capabilities of system 100. In an embodiment, local VPS 120 may receive trigger words 114 and/or voice commands 108 for operating laptop 118, and may operate laptop 118 using the trigger words 114 and/or voice commands 108 to perform the corresponding actions. Alternatively, the local VPS 120 may provide such trigger words 114 and/or voice commands 108 to VPS 102 for processing, as described herein.

Other examples of such processing capabilities for VPS 120 may include, receiving and/or combining audio data from microphones 104, identifying trigger words 114 and/or voice commands 108, and computing SNR 116. In an embodiment, different VPSs 102, 120 of system 100 may be used for different purposes. For example, each VPS 102, 120 may be dedicated to processing user voice 112 of a particular user of system, with whom VPS 102, 120 may be calibrated to identify and/or to respond. Or, for example, a local VPS 120 may be operable to identify trigger words 114 or voice commands 108 and signal VPS 102 that a particular trigger word 114 or voice command 108 has been identified.

In an embodiment, VPS 102 may be used to identify the words being spoken by one or more users, and as received by microphones 104. In an embodiment, conventional word identification and processing techniques may be used to identify trigger words 114 and/or voice commands 108 from the received and/or combined audio data 106. VPS 102 may perform additional processing such as recognizing or identifying which user(s) are speaking, authenticating passwords, or implementing other security measures may be needed to gain access to various systems based on stored system data such as voice or audio signatures. The voice or audio signatures are described in greater detail below. In an embodiment, VPS 102 may first authenticate or identify a user before or simultaneously with accepting commands from the user.

In an embodiment, VPS 102 may have different modes of operation. For example, when not being used (or after having not been used for a period of time), VPS 102 may enter a power save or sleep mode. During the sleep mode, VPS 102 may reduce what processing is being performed. For example, VPS 102 may remotely signal one or more microphones 104 to be disabled or turned off, while others remain active. Or, for example, VPS 102 may reduce how often data 106 received from microphones 104 is processed, thereby consuming fewer resources. However, upon the detection of a trigger word 114, VPS 102 may wake up, become fully active. In an embodiment, while in the active state, VPS 102 may begin 'listening' to data 106 for one or more voice commands 108 to perform functions corresponding to those voice commands 108. In contrast, while in power save or sleep mode, VPS 102 may only be listening for one or more trigger words 114. In an embodiment, VPS 102 may periodically listen to data 106 from microphones 104 at fewer intervals during standby mode than during active mode. In an embodiment, VPS 102 may be communicatively coupled to microphones 104 and may modify the functionality of microphones 104 during different phases of operation (e.g., passive versus active mode) turning microphones 104 on/off or modifying how often they transmit data 106.

In an embodiment, data transmissions between microphones 104 and VPS 102 may occur less often when in power-save mode. In another embodiment, during power-save mode only a subset of microphones 104 may remain active. In an embodiment, an active microphone 104 is a microphone that continuously receives sounds 112 and provides such sounds 112 to VPS 102. In an embodiment, a device having one or more microphones 104 (such as laptop 118) while in the active state may be configured to operate in this manner.

In an embodiment, if a particular microphone or subset of microphones are known to regularly have the highest SNR 116 (e.g., they are generally located closer to where the user usually speaks from, such as near a couch where the user usually sits), those microphones 104 may remain active even during power save mode. In another embodiment, all microphones 104 may remain active and VPS 102 may continue processing as normal during power-save mode, but multimedia device 110 may be powered down or enter a power-save mode (e.g., until trigger word 114 is identified, at which point VPS 102 may signal multimedia device 110 to turn on or enter an active or voice command state).

In an embodiment, detecting trigger word 114 may cause VPS 102 to activate (e.g., leave power save mode), to activate multimedia device 102, and/or to "listen" for one or more voice commands 108. Example trigger words 114 may be "on," "system activate," or any other system provided or user configured word or password. Voice commands 108 may be a word or phrase that commands or requests VPS 102 to perform some sort functionality. Example voice commands 108 may include turning up/down volume, changing channels, powering on/off a system, requesting internet searches, making a telephone call, dictating a text message or word processing document, or any other commands. Upon receiving and identifying voice commands 108, VPS 102 may cause multimedia device 110 to execute the command.

In an embodiment, VPS 102 may be configured to operate or interact with a number of different devices (e.g., 110). Each device 110 may have its own unique trigger words 114, voice commands 108, and/or authenticated users. For example, a first trigger word 114/voice command 108 may activate a first multimedia device 110, while a second trigger word 114/voice command 108 may activate a different device (not shown), such as a security system. VPS 102 may then authenticate users, and interpret and signal the appropriate devices based on which trigger words 114 and/or voice commands 108 were identified. A voice command 108 may also be a trigger word 114. In an embodiment, VPS 102 may not have trigger words 114 and may only listen for voice commands 108.

In an embodiment, for user identification, a user's voice may need to be calibrated with VPS 102. For example, a user may be prompted to speak a number of different pre-selected, or randomly selected phrases (which may or may not include trigger words 114, passwords, personal information, and/or voice commands 108). VPS 102 may develop a signature for a user's voice. VPS 102 may then use the voice signature to compare it to subsequent user voice 112A data received by microphones to identify or authenticate a user, and/or process voice commands 108 from the identified user.

In an embodiment, system 100 may include time synchronization features to synchronize data 106 as received from different microphones 104. An example of time synchronization may include a timestamp placed on the data when it is received by a microphone 104. VPS 102 may then compare the timestamps of received data 106 to determine which data should be combined and/or the order of combination. VPS 102 may combine data 106 with the same or similar (e.g., within a threshold time interval) timestamp.

Figure 4:
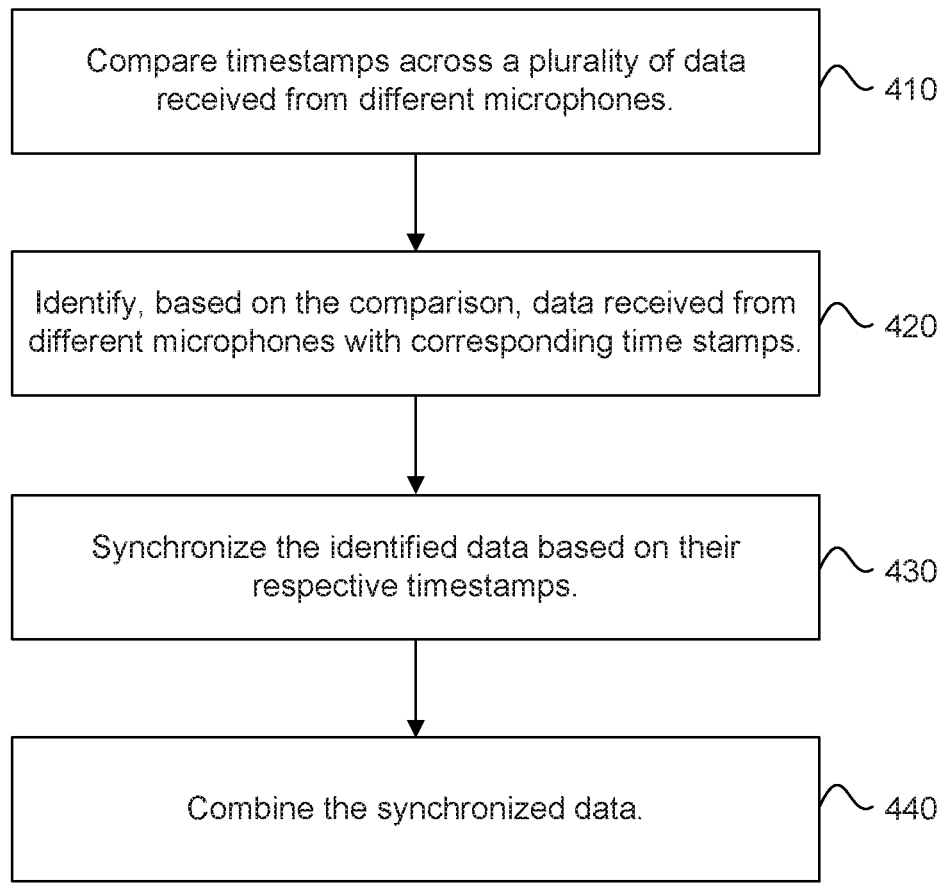
FIG. 4 is a flowchart of a method for distributed voice processing, according to another example embodiment.

FIG. 4 is a flowchart of a method for distributed voice processing, according to another example embodiment. In the example of FIG. 4, data 106 is received with timestamps and is combined accordingly.

In step 410, the timestamps across a plurality of data received from different microphones are compared. For example, VPS 102 may receive data 106 from microphones 104. Each data packet or combination of data packets (e.g., of audio data 106) may include a timestamp of when the data was captured, recorded, transmit, and/or otherwise received. In an embodiment, different microphones 104 may transmit data to VPS 102 at different speeds and/or with different frequencies, as such the timestamps may be used to coordinate which sound 112 was captured at which time. VPS 102 may compare the timestamps of the data 106 to determine which data received from which microphones 104 correspond to a particular period of time.

In step 420, based on the comparison, data with the same or substantially the same timestamps are identified. For example, VPS 102 may group audio data 106 based on the timestamps, so that sounds 112 captured during a similar or overlapping time interval may be compared and/or combined as described herein.

In step 430, the data is synchronized based on the timestamps. For example, once the data 106 with similar or corresponding timestamps are identified and/or grouped, the individual audio data 106 received from the different microphones 104 or devices may be synchronized. In an embodiment, synchronization may include, for example, opening or accessing the different data 106 files and segmenting the data into an overlapping length of audio at a defined length. For example, all the data 106 received at 2:02 pm may be synchronized based the timestamps. In an embodiment, the audio data 106 received may be of varying lengths and of varying intervals of time. As such, all the audio data received for 2:02 pm and 0 seconds to 2:20 pm at 2 seconds may be synchronized. Audio data 106 that was received outside of the defined interval may be discarded or later processed.

In step 440, synchronized data is combined. For example, VPS 102 may compute the SNR 116 for different data 106 to amplify the user voice 112A, reduce noise 112B, identify trigger words 114, voice commands 108, and/or authenticate users as described herein. In an embodiment, once synchronized, conventional voice combination techniques or the techniques described herein may be used to combine the sounds 112 of multiple microphones.

Returning to FIG. 1, in an embodiment, microphones 104 may have a transmit functionality, by which they are able to wired or wirelessly transmit data to VPS 102. As such, microphones 104E and microphones 104A that are geographically located closer to VPS 102 (and thus have shorter transmit times than further places microphones 104B and 104C/104D) may have a synchronized delay in sending data 106 to VPS 102 to account for the variations in transmit times, such that all data 106 is received substantially simultaneously by VPS 102. For example, during a calibration period, VPS 102 may calibrate the transmit time to/from different microphones 104 and may synchronize delays such that data 106 is received from the different microphones 104 at or approximately the same time. VPS 102 may then process received within a specific time interval of each other together for combination.

In an embodiment, VPS 102 may determine or become aware of the geographic location or placement of microphones 104 around a room/location and/or relative to one another. As indicated above, microphones 104 (including devices such as laptop 118 which may have one or more microphones 104) may have a timestamping functionality whereby received sounds 112 are timestamped as to when they were detected, received, or recorded. For example, microphones 104 may provide or include a timestamp on received sounds 112. VPS 102 may compare the received timestamp with data 106 relative to a time to another timestamp when the data 106 was received. The greater the difference, the greater the distance may be between VPS 102 and a respective microphone 104.

Or for example, different microphones may repeatedly have similar SNRs 116 which may, in an embodiment, indicate a relative position to the source(s) of user voice 112 and/or each other. Or, for example, microphones may be equipped with GPS or other location services capabilities that are provided to VPS 102. In an embodiment, this information may be used to triangulate or determine a location of the source(s) of user voice 112A and/or noise 112B. The location of source(s) may then be used to help determine which microphones 104 may have the best or most reliable sound quality (e.g., SNR 116) or may be used to resolve conflicts.

In the example of FIG. 1, VPS 102 is shown as a separate system. In other embodiments, multiple VPS 102 may be networked or communicate with each other to identify multiple users and/or commands for different devices 110. As previously indicated, VPS 102 may be standalone system communicatively coupled with a multimedia or other device, or may be integrated into one or more device 110 and/or microphones 104.

Figure 2:
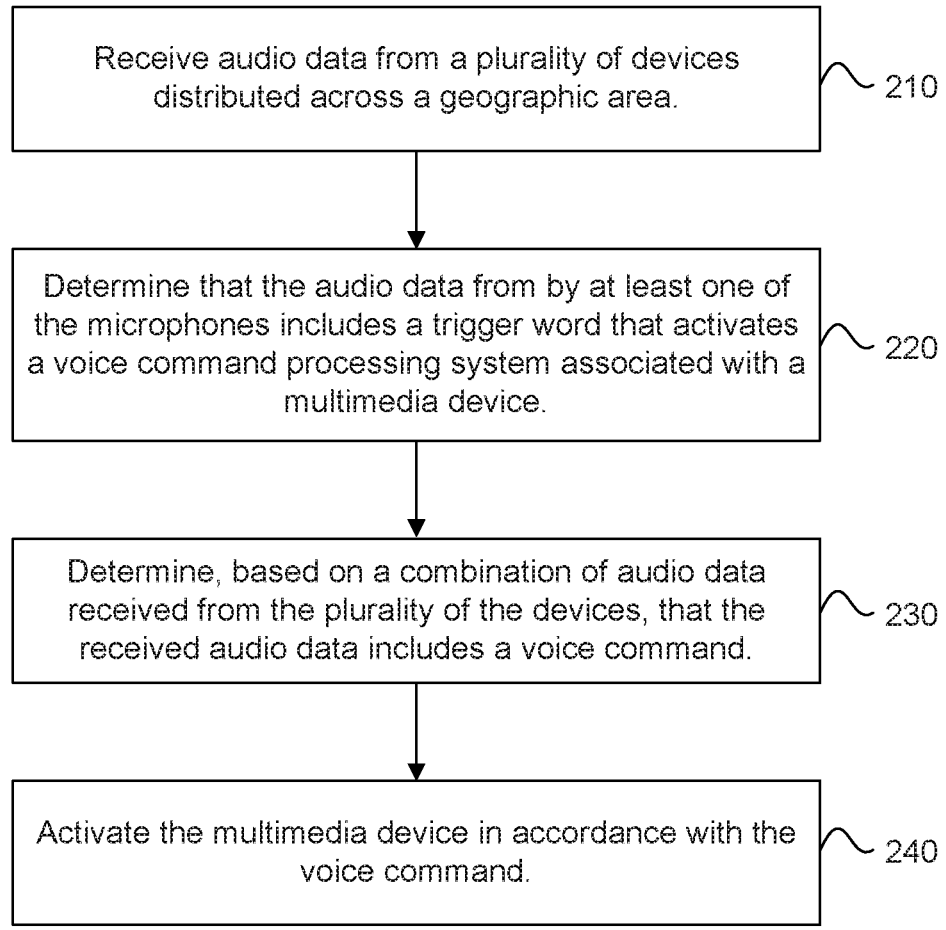
FIG. 2 is a flowchart of a method for distributed voice processing, according to an embodiment.

FIG. 2 is a flowchart for a method 200 for distributed voice processing, according to an embodiment. Method 200 can be performed by processing logic that can comprise hardware (e.g., circuitry, dedicated logic, programmable logic, microcode, etc.), software (e.g., instructions executing on a processing device), or a combination thereof.

At step 210, audio data from a plurality of devices distributed across a geographic area is received. For example, VPS 102 may receive data 106 from microphones 104A-E. Microphones 104A-E, or a subset thereof, may be activated to listen for sounds 112 such as user voice 112A and/or noise 112B.

At step 220, it is determined that the audio data from by at least one of the microphones includes a trigger word that activates a voice command processing system associated with a multimedia device. For example, VPS 102 may combine and process data 106 to determine that trigger word 114 was spoken by one or more users. In response, VPS 102 may enter an active state and begin listening or scanning audio data from microphones for one or more voice commands 108 or wake up/activate one or more multimedia devices 110. Multimedia device 110 can be any computing device, including a computer, stereo system, speaker system, home temperature/climate/security system, television, or other device which may respond to or be integrated with a voice activation system (e.g., VPS 102).

In another embodiment, VPS 102 may receive an indication that trigger word 114 was received by one or more microphones 104. In an embodiment, instead of using or identifying a trigger word 114, a button on a remote control or cell phone which does not include voice may be used to activate VPS 102.

At step 230, it is determined, based on a combination of audio data received from the plurality of the devices, that the received data includes a voice command. For example, VPS 102 may receive data 106 from microphones 104A-E. VPS 102 may determine a SNR 116 for the received data, combine the data across one or more of the microphones 104, to improve the clarity of user voice 112A in the data (as described above, into single audio stream according to well-known signal processing operations). VPS 102 may then scan or listen to the combined, enhanced, or improved data 106 to determine whether any voice commands 108 were spoken. In an embodiment, data from different microphones 104 may be combined based on whether the received data 104 includes noise 112B and/or user voice 112A data, and in what ratio to either enhance user voice 11A and/or reduce noise 112B.

In an embodiment, one microphone 104 associated with each of the two or more devices (e.g., standalone microphones or device, such as laptop 118) may receive at least a portion of the audio data 106 corresponding to the voice command 108. For example, a user may be turning his/her head or moving while speaking, which may cause one microphone 104A to capture a first portion of the user voice 112A (that includes a first portion of a voice command 108) and a second microphone 104B to capture a second portion of the user voice 112B (that includes a second portion of a voice command 108). In an embodiment, VPS 102 may combine the first portion and second portion captured by the different microphones 104A and 104B (e.g., based on timestamps) to identify the voice command 108.

At step 240, the multimedia device is activated in accordance with the voice command. For example, VPS 102 may signal multimedia device 110, such as a television, to change a channel, stream a particular program, or launch an application based on the identified voice command 108.

Figure 3:
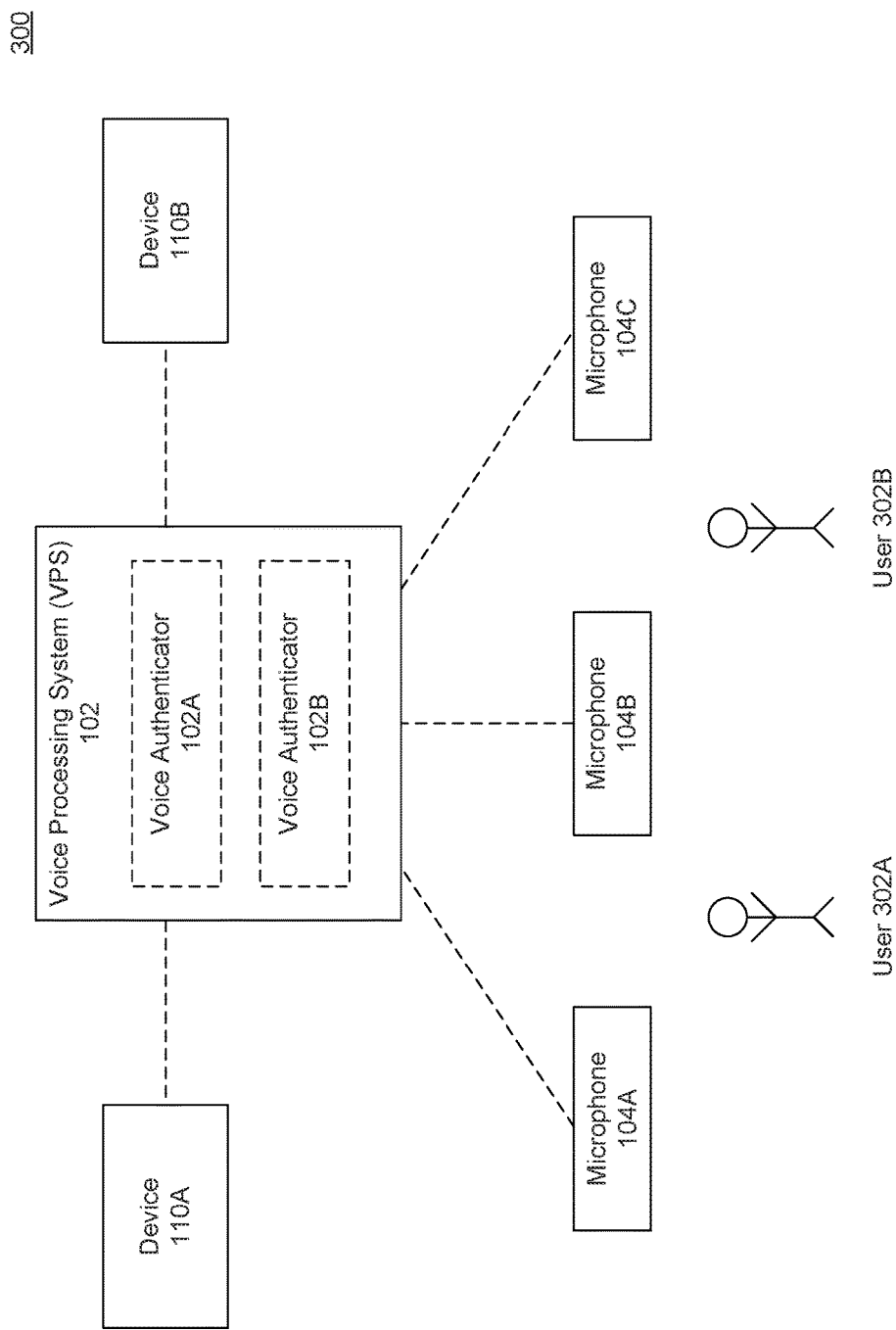
FIG. 3 is a block diagram of a distributed voice processing system, according to another example embodiment.

FIG. 3 is a block diagram of a distributed voice processing system 300, according to another example embodiment. VPS 102 may receive data from microphones 104A-C which may be intended to capture the voices from users 302A and 302B. In the example, shown, VPS 102 may include both a voice authenticator 102A and voice interpreter 102B. Voice interpreter 102B may operate similar the VPS 102 described above with respect to listening for or identifying trigger words 114, voice commands 108, passwords, and the like.

Voice authenticator 102A may identify which user(s) 302A or 302B are speaking. VPS system 102 may also determine whether the identified user 302A or 302B is authorized to perform the requested or received voice command, or whether a received password corresponds to a saved password for the user 302. For example, using the techniques described above, VPS 102 may enhance or improve the sound quality of received data from microphones 104A-C. In an embodiment, this may include reducing noise that may have been received with the voice of a particular user 302. This noise may include the sound of a different or unauthorized user 302.

In the example shown, users 302A and 302B may be speaking, however only user 302A may be authorized to access device 110A or 110B. As such, voice authenticator 102A may perform processing to identify when user 302A is speaking (as discussed above using user signatures), and then voice interpreter 102B may determine if any commands were spoken. Or, for example, each user 302A may be authorized to speak different commands or have access to control different devices 110A, 110B. VPS 102 may then differentiate between the voices using voice authenticator 120 and determine whether a use has been authorized to perform a spoken or identified command.

If the user is authorized, VPS 102 may execute the command. If the user is not authorized, VPS 102 may ignore the command or provide audio or visual feedback indicating the command has been rejected or is otherwise unauthorized. In an embodiment, VPS 102 may perform a calibration with each user 302 so that VPS 102 can identify, authenticate, or differentiate the users 302.

Figure 5:
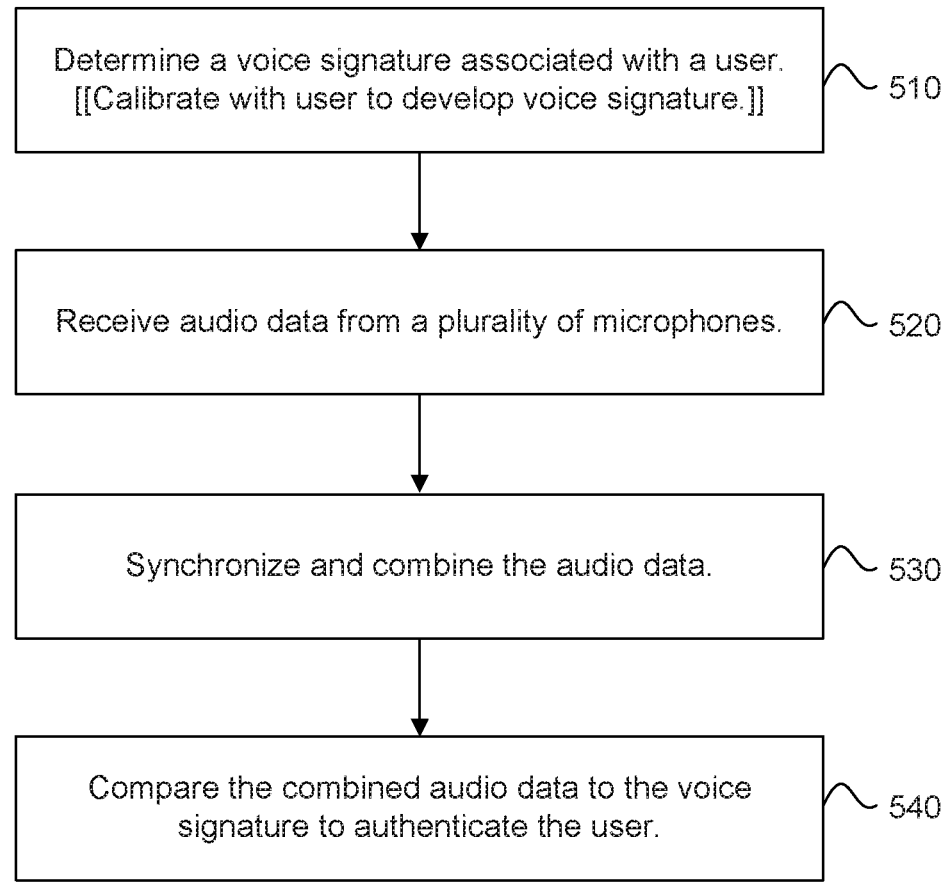
FIG. 5 is a flowchart of another method for distributed voice processing, according to another example embodiment.

FIG. 5 is a flowchart of a method for distributed voice processing, according to another example embodiment. In the example of FIG. 5, voice authentication is performed by VPS 102.

In step 510, a voice signature associated with a user is identified. For example, VPS 102 may have access to a voice signature that has been previously established for one or more users with VPS 102 or another system. Or, for example, a user may set up a voice signature or otherwise calibrate his/her voice with VPS 102. For example, the user may be prompted to speak certain words (including but not limited to trigger words 114, passwords, usernames, and voice commands 108) such that VPS 102 may establish a voice signature file.

Using the voice signature file, VPS 102 may authenticate and identify a user, and/or may be better able to identify trigger words 114 and voice commands 108 spoken by one or more users.

In step 520, audio data may be received from a plurality of microphones. For example, VPS 102 may receive data 106 from microphones 104 (or a subset thereof, such as from a device with multiple microphones), including user voice 112A and/or noise 112B.

In step 530, the audio data may be synchronized and combined. For example, as described above (particularly with respect to FIG. 4), VPS 102 may synchronize and combine the data 106 received from the different microphones 104 to create a single, enhanced voice sample. The enhanced voice sample may have been noise reduced as described above.

In step 540, the combined audio data may be compared to the voice signature to authenticate the user. For example VPS 102 may compare the enhanced voice sample to the voice signature to identify or authenticate the user. In an embodiment, VPS 102 may determine, based on the comparison, that trigger words 114, voice commands 108, user names, or passwords and may respond accordingly. For example, VPS 102 may turn on or activate a system that may have previously been in power save mode, allow the user access to a system based on the authentication, or execute the identified command. If, VPS 102 is unable to authenticate the user based on the comparison, VPS 102 may ask the user to re-authenticate him/herself by speaking again, lock the user out of a secure system, signal an error to the user, or do nothing at all.

Figure 6:
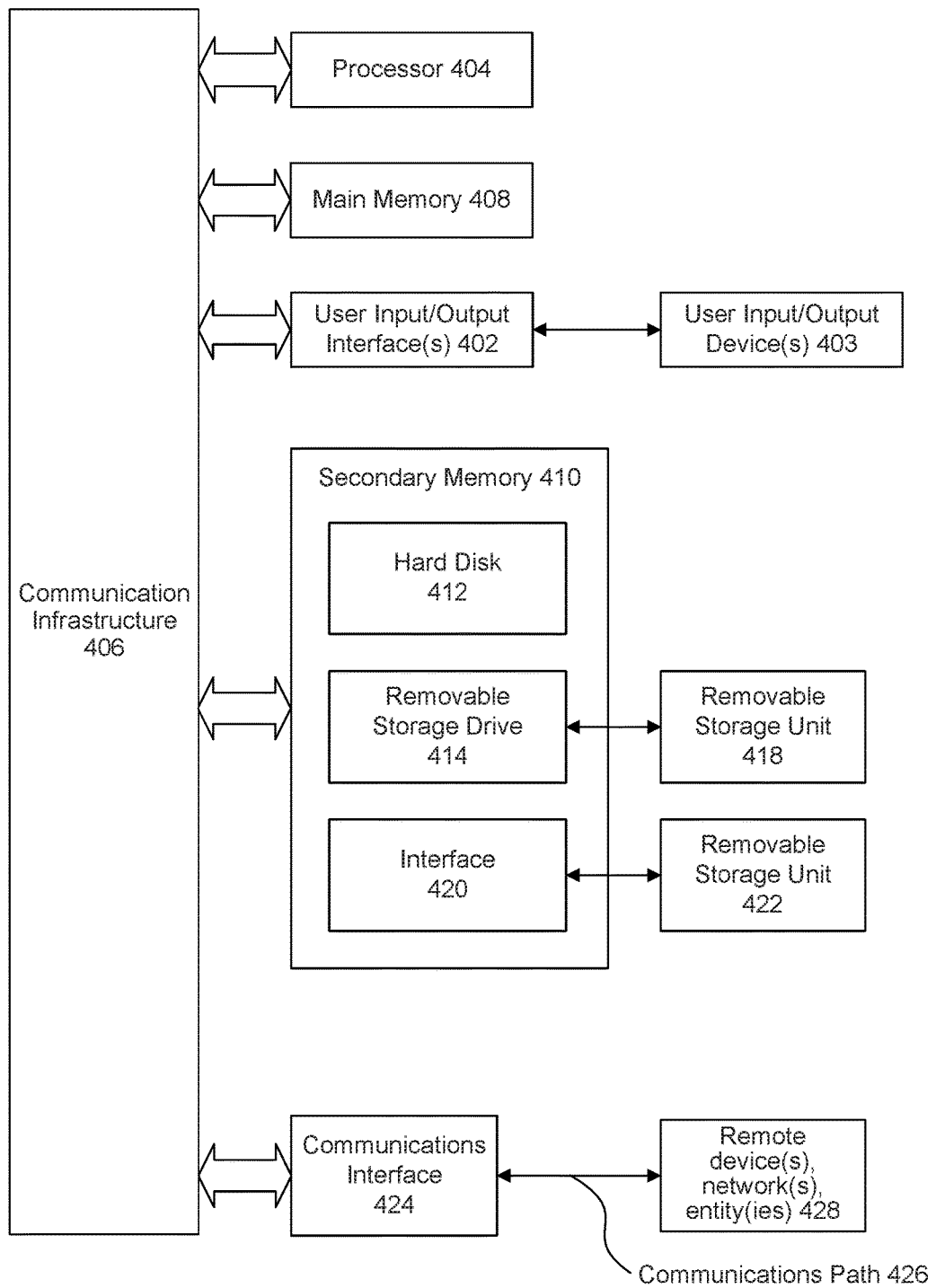
FIG. 6 is an example computer system useful for implementing various embodiments.

Various embodiments can be implemented, for example, using one or more computer systems, such as computer system 600 shown in FIG. 6. Computer system 600 can be used, for example, to implement method 600 of FIG. 6. For example, computer system 600 can determine a resource block allocation of a portion of a tone space using a lookup table. Computer system 600 can further map a plurality of tones to a resource block based on the determined resource block allocation, according to some embodiments. Computer system 600 can be any computer capable of performing the functions described herein.

Computer system 600 can be any well-known computer capable of performing the functions described herein.

Computer system 600 includes one or more processors (also called central processing units, or CPUs), such as a processor 604. Processor 604 is connected to a communication infrastructure or bus 606.

One or more processors 604 may each be a graphics processing unit (GPU). In an embodiment, a GPU is a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 600 also includes user input/output device(s) 603, such as monitors, keyboards, pointing devices, etc., that communicate with communication infrastructure 606 through user input/output interface(s) 602.

Computer system 600 also includes a main or primary memory 608, such as random access memory (RAM). Main memory 608 may include one or more levels of cache. Main memory 608 has stored therein control logic (i.e., computer software) and/or data.

Computer system 600 may also include one or more secondary storage devices or memory 610. Secondary memory 610 may include, for example, a hard disk drive 612 and/or a removable storage device or drive 614. Removable storage drive 614 may be a floppy disk drive, a magnetic tape drive, a compact disk drive, an optical storage device, tape backup device, and/or any other storage device/drive.

Removable storage drive 614 may interact with a removable storage unit 618. Removable storage unit 618 includes a computer usable or readable storage device having stored thereon computer software (control logic) and/or data. Removable storage unit 618 may be a floppy disk, magnetic tape, compact disk, DVD, optical storage disk, and/any other computer data storage device. Removable storage drive 614 reads from and/or writes to removable storage unit 618 in a well-known manner.

According to an exemplary embodiment, secondary memory 610 may include other means, instrumentalities or other approaches for allowing computer programs and/or other instructions and/or data to be accessed by computer system 600. Such means, instrumentalities or other approaches may include, for example, a removable storage unit 622 and an interface 620. Examples of the removable storage unit 622 and the interface 620 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 600 may further include a communication or network interface 624. Communication interface 624 enables computer system 600 to communicate and interact with any combination of remote devices, remote networks, remote entities, etc. (individually and collectively referenced by reference number 628). For example, communication interface 624 may allow computer system 600 to communicate with remote devices 628 over communications path 626, which may be wired and/or wireless, and which may include any combination of LANs, WANs, the Internet, etc. Control logic and/or data may be transmitted to and from computer system 600 via communication path 626.

In an embodiment, a tangible apparatus or article of manufacture comprising a tangible computer useable or readable medium having control logic (software) stored thereon is also referred to herein as a computer program product or program storage device. This includes, but is not limited to, computer system 600, main memory 608, secondary memory 610, and removable storage units 618 and 622, as well as tangible articles of manufacture embodying any combination of the foregoing. Such control logic, when executed by one or more data processing devices (such as computer system 600), causes such data processing devices to operate as described herein.

Based on the teachings contained in this disclosure, it will be apparent to persons skilled in the relevant art(s) how to make and use embodiments of the invention using data processing devices, computer systems and/or computer architectures other than that shown in FIG. 6. In particular, embodiments may operate with software, hardware, and/or operating system implementations other than those described herein.

It is to be appreciated that the Detailed Description section, and not the Summary and Abstract sections (if any), is intended to be used to interpret the claims. The Summary and Abstract sections (if any) may set forth one or more but not all exemplary embodiments of the invention as contemplated by the inventor(s), and thus, are not intended to limit the invention or the appended claims in any way.

While the invention has been described herein with reference to exemplary embodiments for exemplary fields and applications, it should be understood that the invention is not limited thereto. Other embodiments and modifications thereto are possible, and are within the scope and spirit of the invention. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments may perform functional blocks, steps, operations, methods, etc. using orderings different than those described herein.

References herein to "one embodiment," "an embodiment," "an example embodiment," or similar phrases, indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein.

The breadth and scope of the invention should not be limited by any of the above-described exemplary embodiments, but should be defined only in accordance with the following claims and their equivalents.

What is claimed is:

1. A method, comprising:
   receiving, at a computing device during a system sleep mode, audio data from microphones associated with a plurality of devices, including at least one laptop computer and at least one device that is other than a laptop computer, distributed across an area of interest;
   determining a first timestamp associated with audio data from a first one of the microphones from the at least one laptop computer and a second timestamp associated with audio data from a second one of the microphones from the at least one device that is other than a laptop computer are within a synchronization interval;
   synchronizing the received audio data from the at least one laptop computer and the at least one device that is other than a laptop computer based on the synchronization interval;
   detecting a trigger word in the synchronized audio data received from the plurality of devices;
   responsive to detecting the trigger word, both switching the system in an active mode in which subsequent audio data is received from the plurality of devices at a smaller time interval in the active mode relative a larger time interval in the sleep mode, and activating a voice command processing system associated with a multimedia device;
   determining, based on the audio data received from at least two or more of the plurality of devices, that the synchronized audio data includes a voice command associated with the multimedia device, wherein at least one microphone associated with each of the two or more of the plurality of devices receives at least a portion of the audio data corresponding to the voice command; and
   controlling the multimedia device in accordance with the voice command.

2. The method of claim 1, wherein the plurality of devices are communicatively coupled to the computing device via a wireless network.

3. The method of claim 1, wherein the determining that the audio data includes the voice command comprises:
   receiving, at the computing device, an indication from at least one of the plurality of devices that the trigger word has been received by the at least one of the plurality of devices, wherein the at least one of the plurality of devices determines that at least one microphone associated with the at least one of the plurality of devices received audio data corresponding to the trigger word.

4. The method of claim 1, wherein the determining that the audio data includes the voice command comprises:
   determining, by the computing device, that the audio data includes the trigger word based on audio data received from the at least two or more of the plurality of devices.

5. The method of claim 1, further comprising:
   determining a signal-to-noise ratio for audio data received from a subset of the microphones, wherein the subset of the microphones are physically positioned within or proximate to one of the plurality of devices.

6. The method of claim 1, further comprising:
   identifying which microphone is associated with a highest signal-to-noise ratio of the audio data received from the microphones; and
   wherein detecting the trigger word comprises using audio data received from the identified microphone to detect said trigger word.

7. The method of claim 1, further comprising:
   combining the received audio data based on signal-to-noise ratios, wherein one or more of the microphones with highest signal-to-noise ratios are used to enhance the voice command or trigger word from the received audio data, and wherein one or more of the microphones with lowest signal-to-noise ratios are used to cancel out noise from the received audio data associated with the highest signal-to-noise ratios.

8. The method of claim 1, wherein the audio data received from the laptop computer includes combined audio data received from a plurality of microphones associated with the laptop computer that has been combined into the combined audio data by the laptop computer prior to being received at the computing device.

9. The method of claim 1, wherein the synchronizing comprises:
   applying a first weight to the audio data received from the at least one laptop computer;
   applying a second weight to the audio data received from the at least one device that is other than a laptop computer; and
   combining the audio data based on the first weight and the second weight, wherein the first weight and the second weight are assigned based on a signal-to-noise ratio of the audio data received from the laptop computer relative to a signal-to-noise ratio of the audio data received from the one device that is other than the laptop computer.

10. The method of claim 9, wherein combining comprises:
    determining which audio data has a lower signal-to-noise ratio; and
    depressing an amount of noise in the audio data with a higher signal-to-noise ratio with the audio data with the lower signal-to-noise ratio.

11. A system comprising:
    a memory; and
    at least one processor communicatively coupled to the memory and configured to:
    receive audio data from microphones associated with a plurality of devices during the system sleep mode, including at least one laptop computer and at least one device that is other than a laptop computer, distributed across an area of interest;
    determine a first timestamp associated with audio data from a first one of the microphones from the at least one laptop computer and a second timestamp associated with audio data from a second one of the microphones from the at least one device that is other than a laptop computer are within a synchronization interval;

synchronize the received audio data from the at least one laptop computer and the at least one device that is other than a laptop computer based on the synchronization interval;

detect a trigger word in the synchronized audio data received from the plurality of devices;

responsive to detecting the trigger word, both switch the system in an active mode in which subsequent audio data is received from the plurality of devices at a smaller time interval in the active mode relative a larger time interval in the sleep mode and activate a voice command processing system associated with a multimedia device;

determine, based on the audio data received from at least two or more of the plurality of devices, that the audio data includes a voice command associated with the multimedia device, wherein at least one microphone associated with each of the two or more of the plurality of devices receives at least a portion of the voice command; and signal the multimedia device to perform an action in accordance with the voice command.

12. The system of claim 11, wherein to detect a trigger word in the audio data, the at least one processor is configured to:
receive an indication from at least one of the plurality of devices that the trigger word has been received by one of the microphones, wherein the at least one of the plurality of devices determines that at least one microphone associated with the at least one of the plurality of devices received audio data corresponding to the trigger word.

13. The system of claim 11, wherein to determine that the received audio data includes the voice command, the at least one processor is configured to:
determine that the audio data includes the trigger word based on the audio data received from the two or more of the plurality of devices.

14. The system of claim 11, wherein to receive audio data, the at least one processor is configured to:
determine a signal-to-noise ratio for audio data received from each of the plurality of devices.

15. The system of claim 14, wherein to determine the signal-to-noise ratio, the at least one processor is configured to:
determine the signal-to-noise ratio for audio data received from a subset of the microphones, wherein the subset of the microphones are physically positioned within or communicatively coupled to one of the plurality of devices.

16. The system of claim 15, wherein the at least one processor is further configured to:
identify which microphone or device is associated with a highest signal-to-noise ratio of audio data received from the microphones; and
wherein to detect the trigger word, the at least one processor is configured to use audio data received from the identified microphone to detect the trigger word or the voice command.

17. The system of claim 14, wherein the at least one processor is further configured to:

combine the received audio data based on the signal-to-noise ratios, wherein one or more of the microphones with highest signal-to-noise ratios are used to enhance the voice command or trigger word from the received audio data, and wherein one or more of the microphones with lowest signal-to-noise ratios are used to cancel out noise from the received audio data associated with the highest signal-to-noise ratios.

18. A tangible computer-readable device having instructions stored thereon that, when executed by at least one computing device, cause the at least one computing device to perform operations comprising:
receiving audio data from a plurality of devices during a system sleep mode, including at least one laptop computer and at least one device that is other than a laptop computer, distributed across a geographic area, each of the plurality of devices comprising one or more microphones configured to receive sounds that are provided as the audio data;

determining a first timestamp associated with audio data from a first one of the microphones from the at least one laptop computer and a second timestamp associated with audio data from a second one of the microphones from the at least one device that is other than a laptop computer are within a synchronization interval;

synchronizing the received audio data from the at least one laptop computer and the at least one device that is other than a laptop computer based on the synchronization interval;

determining, based on the synchronized audio data received from the two or more of the plurality of devices, that the synchronized audio data includes a voice command, wherein at least one respective microphone on each of the plurality of devices receives at least a portion of the voice command;

responsive to detecting the voice command, both switching the system in an active mode in which subsequent audio data is received from the plurality of devices at a smaller time interval in the active mode relative a larger time interval in the sleep mode, and activating a voice command processing system associated with a multimedia device; and activating a multimedia device in accordance with the voice command.

19. The device of claim 18, wherein the determining comprises:
determining a signal-to-noise ratio for the audio data from each of the plurality of devices, wherein a signal of the signal-to-noise ratio corresponds to the voice command as spoken by a user, and noise of the signal-to-noise ratio corresponds to any of the sounds received by the one or more microphones that do not correspond to the voice command; and
combining the audio data based on the signal-to-noise ratio.

20. The device of claim 18, wherein the determining comprises:
receiving, from one of the plurality of devices, an indication that the voice command has been received by one of the one or more microphones, wherein the determination that the voice command was received by one of the one or more microphones is made by the one of the plurality of devices.

* * * * *